US008692775B2

(12) United States Patent
Takei et al.

(10) Patent No.: US 8,692,775 B2
(45) Date of Patent: Apr. 8, 2014

(54) KEY STRUCTURE OF OPERATION SECTION OF ELECTRONIC DEVICE, INPUT DEVICE AND ELECTRONIC DEVICE USING SAME

(75) Inventors: Yutaka Takei, Tokyo (JP); Masakazu Tsujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 276 days.

(21) Appl. No.: 13/144,669

(22) PCT Filed: Jan. 14, 2010

(86) PCT No.: PCT/JP2010/050355
§ 371 (c)(1),
(2), (4) Date: Jul. 14, 2011

(87) PCT Pub. No.: WO2010/087234
PCT Pub. Date: Aug. 5, 2010

(65) Prior Publication Data

US 2011/0273373 A1 Nov. 10, 2011

(30) Foreign Application Priority Data

Jan. 27, 2009 (JP) ................................. 2009-016040

(51) Int. Cl.
*G06F 3/02* (2006.01)

(52) U.S. Cl.
USPC ............................ 345/169; 345/168; 345/156

(58) Field of Classification Search
USPC .......... 345/168, 156, 157, 169, 170, 172, 173
See application file for complete search history.

(56) References Cited

FOREIGN PATENT DOCUMENTS

| | | | | |
|---|---|---|---|---|
| JP | 54-178088 U | | 12/1979 | |
| JP | 04-319216 A | | 11/1992 | |
| JP | 10-222269 A | | 8/1998 | |
| JP | 11/164068 | * | 6/1999 | ............... H04N 1/00 |
| JP | 11-164068 A | | 6/1999 | |
| JP | 2003/317567 | * | 11/2003 | ............ H01H 13/14 |
| JP | 2003-317567 A | | 11/2003 | |
| JP | 2007-109419 A | | 4/2007 | |
| JP | 2008-117660 A | | 5/2008 | |

OTHER PUBLICATIONS

Office Action, dated Jan. 15, 2013, issued by the Japanese Patent Office in counterpart Japanese Application No. 2009-016040.

* cited by examiner

*Primary Examiner* — Andrew Sasinowski
(74) *Attorney, Agent, or Firm* — Sughrue Mion, PLLC

(57) ABSTRACT

There is provided a key structure of an operation section of an electronic device that can avoid an occurrence of operational errors of erroneously pressing down an operation key and can reliably secure a large area for input operations and for indicating information. The key structure of the operation section of the electronic device having a plurality of the operation keys 14, 14, . . . arranged in parallel in a manner to be adjacent to one another. The operation portion having a step height (wall surface 23) is formed in the operation key that can perform input operations by being pressed down with a finger of an operator. The operation portion of the operation key is made up of a higher step surface located in a higher level portion in a pressed-down direction and a lower step surface formed at least on an adjacent side where the operation keys are adjacent to one another in a level portion lower than the higher step surface in the pressed-down direction. Each of the higher step surface and the lower step surface is formed so as to be approximately planar and a width of the lower step surface is set to be not less than a half of an error width W of the press-down operation as a width in an adjacent direction with respect to the higher step surface.

6 Claims, 7 Drawing Sheets

KEY STRUCTURE OF OPERATION SECTION OF ELECTRONIC DEVICE, INPUT DEVICE AND ELECTRONIC DEVICE USING SAME

CROSS REFERENCE TO RELATED APPLICATIONS

This application is a National Stage of International Application No. PCT/JP2010/050355 filed Jan. 14, 2010, claiming priority based on Japanese Patent Application No. 2009-016040, filed Jan. 27, 2009, the contents of all of which are incorporated herein by reference in their entirety.

TECHNICAL FIELD

The present invention relates to a key structure of an operation section of an electronic device, an input device and electronic device using the same and more particularly to the key structure of the operation section of the electronic device, the input device and the electronic device that can secure an operation area for inputting operations and a large area for indicating information.

BACKGROUND TECHNOLOGY

Some electronic devices are operated by inputting various information. For example, on an electronic device such as a mobile phone, an operation key for inputting various information is arranged in its operation portion, or to a personal computer, a key board (input device) having operation keys thereon is connected. On a surface of an operation key of such a kind, various information for distinguishing one from another is indicated.

However, the operation keys of the kind are arranged in positions adjacent to one another, resulting in the occurrence of erroneous inputting in some cases. In order to reduce the erroneous inputting, various kinds of contrivances are proposed. For example, in operation keys of a mobile phone, it is proposed that the position of an operation key can be identified by bending a surface of a central portion in a convex shape (for example, Related Patent Reference 1). Moreover, it is proposed that a boundary between adjacent operation keys is formed to have a shape of an indentation and by arranging an EL (ElectroLuminescent) sheet that emits light, the position of the operation key can be easily identified by the light emitted spontaneously in the boundary region (for example, Related Patent Reference 2). Further, it is proposed that a level difference portion is formed in a boundary of operation keys adjacent thereto (for example, Related Patent Reference 3).

It is also proposed that, by making small an operation surface placed in a central portion on an upper surface side of an operation key used for press-down inputting operations, the erroneous press-down of an operation portion of adjacent operation keys can be prevented (for example, Related Patent Reference 4).

It is further proposed that, by forming a step height portion in an area surrounding an operation key to obtain a flange shape and by letting wall surfaces of the operation keys be faced towards one another, the entry of foreign matters is prevented (for example, Related Patent Reference 5).

RELATED ART DOCUMENTS

Patent References

Patent Reference 1: Japanese Patent Application Laid-Open No. 2007-109419.

Patent Reference 2: Japanese Patent Application Laid-Open No. 2008-117660.

Patent Reference 3: Japanese Patent Application Laid-Open No. Hei 11-164068.

Patent Reference 4: Japanese Patent Application Laid-Open No. Hei 10-222269; and Patent Reference 5: Japanese Patent Application Laid-Open No. 2003-317567.

SUMMARY OF INVENTION

Problems to be Solved by the Invention

However, in the case of the operation key disclosed in the Related Art Patent Reference 1, due to the non-planar surface of the operation key, indicating of various information is difficult and, since there is danger of simultaneously pressing down the operation keys adjacent to one another, special attention or care of an operator is required to avoid the erroneous inputting.

Moreover, in the operation key disclosed in the Related Art Patent References 2 and 3, as shown in FIGS. 6A and 6B, a chamfered portion 101 is formed in a portion surrounding an operation key 100 so that each operation key 100 can be easily differentiated from other operation keys, however, special attention or care of an operator is still required to avoid the erroneous inputting caused by simultaneous input by striding the chambered portion. In the case of the formation of chamfered portion, since an area of the chamfered portion 101 is small, when the large operation keys 100 are arranged in an adjacent manner, the differentiation of the boundary among the chamfered portions is difficult, thus causing the erroneous input in some cases.

In the operation key disclosed in the Related Art Patent Reference 4, an operation surface located on an upper surface side is extremely smaller than an area occupied by the operation key, which causes a problem of being not capable of sufficiently securing an area to indicate various information.

Moreover, in the operation key disclosed in the Related Art Patent Reference 5, a flange-shaped portion located in the lower level portion is formed in a portion surrounding an operation portion located on an upper surface side, however, it serves to merely fringe a portion surrounding an operation key and, therefore, special attention or care of an operator is required to avoid the erroneous inputting caused by simultaneous input.

Incidentally, there is still another means to prevent the erroneous inputting caused by simultaneous input; that is, as shown in FIGS. 7A and 7B, by forming an immovable portion 110 integrally formed with a housing among the operation keys 100, the simultaneous inputting of the operation key 100 may be avoided. However, in such a configuration, the immovable portion 110 has to be formed in each of adjacent portions of the operation keys 100 and an area of each of operation surfaces has to be made large so as to allow the operation key 100 to be reliably pressed down, as a result, interfering with small-sizing of the area of the operation key 100 and with miniaturization of the entire device.

With respect to the above, an object of the present invention is to provide a structure of an operation portion key of an electronic device and the electronic device using the same which can avoid operational errors of erroneously pressing down an operation key and can secure a large operation surface for inputting and for indicating information.

Means for Solving the Problems

In order to solve the above problems, the present invention is configured so as to be characterized in that the key structure of an operation section of an electronic device has a plurality of operation keys arranged in parallel in a manner to be adjacent to one another and the operation portion has a step height formed in the operation key that performs input operations by being pressed down with a finger of an operator and the operation portion of the operation key includes a higher step surface located in a higher level portion in a pressed-down direction and a lower step surface formed at least on an adjacent side where the operation keys are adjacent to one another in a level portion lower than the higher step surface in the pressed-down direction and each of the higher step surface and the lower step surface is formed so as to be approximately planar and a width of the lower step surface is set to be not less than a half of an error width of the press-down operation as a width in an adjacent direction with respect to the higher step surface.

Effects of Invention

According to the present invention, on a boundary side among operation keys adjacent to one another, a lower step surface having a press-down error width with a boundary line as its central line is located. Therefore, at a time of pressing down a higher step surface of one operation key, a higher step surface of another adjacent operation key is not pressed down, thus enabling a reliable avoidance of an erroneous inputting. As a result, by configuring the operation key using the higher step surface and lower step surface, its occupied area can be small-sized. Moreover, the lower step surface is formed so as to be planar in parallel to the higher step surface in a state in which the lower step surface can be identified and various information can be indicated. As a result, it is made possible not only to make the operation key small but also to secure a large area for performing the input operation and to enlarge the area for indicating information.

BRIEF DESCRIPTION OF DRAWINGS

FIG. 2A is a plan view of the operation key and FIG. 2B is a vertical cross-sectional view of the operation key.

FIG. 3A is a schematic plan view of the operation key and FIG. 3B is a schematic vertical cross-sectional view of the operation key.

FIG. 5A is a vertical cross-sectional view of the operation key, FIG. 5B is an expanded vertical cross-sectional view of the operation key in the circled area shown in FIG. 5A, and FIG. 5C is an expanded vertical cross-sectional view of the operation key in the circled area shown in FIG. 5B.

FIG. 6A is its plan view of the operation key and FIG. 6B is its cross-sectional view showing the operation key; FIG. 7A is its plan view of the operation key and FIG. 7B is its cross-sectional view showing the operation key.

BEST MODE OF CARRYING OUT THE INVENTION

There is provided a structure of an operation portion key for an electronic device having a plurality of operation keys arranged in parallel in a manner to be adjacent to one another. The operation portion has a step height formed in the operation key that performs input operations by being pressed down with a finger of an operator. The operation portion of the operation key includes a higher step surface located in a higher level portion in a pressed-down direction and a lower step surface formed at least on an adjacent side where the operation keys are adjacent to one another in a level portion lower than the higher step surface in the pressed-down direction. Each of the higher step surface and the lower step surface is formed so as to be approximately planar and a width of the lower step surface is set to be not less than a half of a error width of the pressed-down operation as a width in an adjacent direction with respect to the higher step surface. The step height between the higher step surface and the lower step surface is set to be not less than pressed-down height required for the input operations.

Hereinafter, an exemplary embodiment of the present invention will be described in detail with reference to drawings.

EXEMPLARY EMBODIMENT

Figure 1:
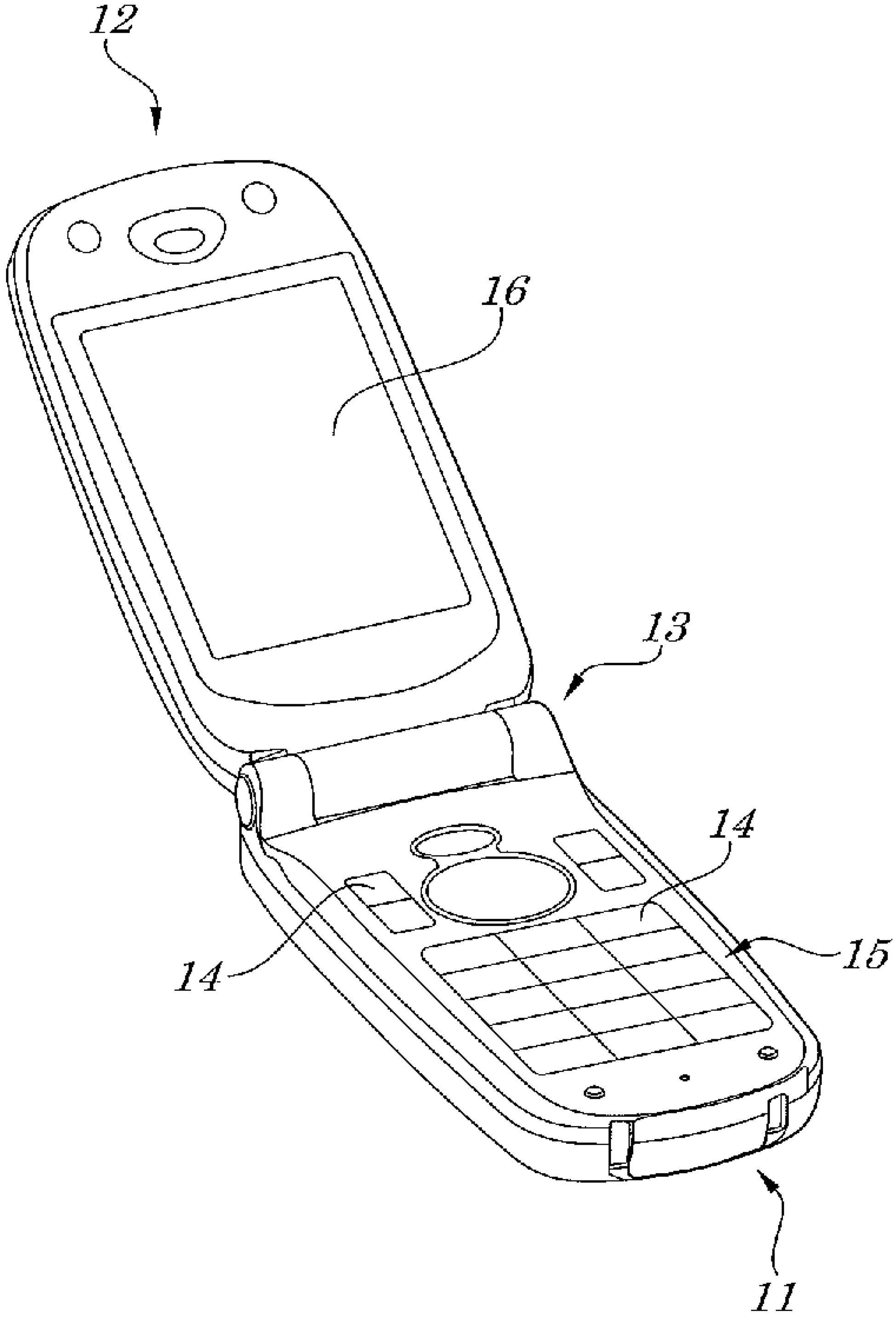
FIG. 1 is a perspective drawing showing an external view of a mobile phone according to one exemplary embodiment of the present invention.
Figure 2A:
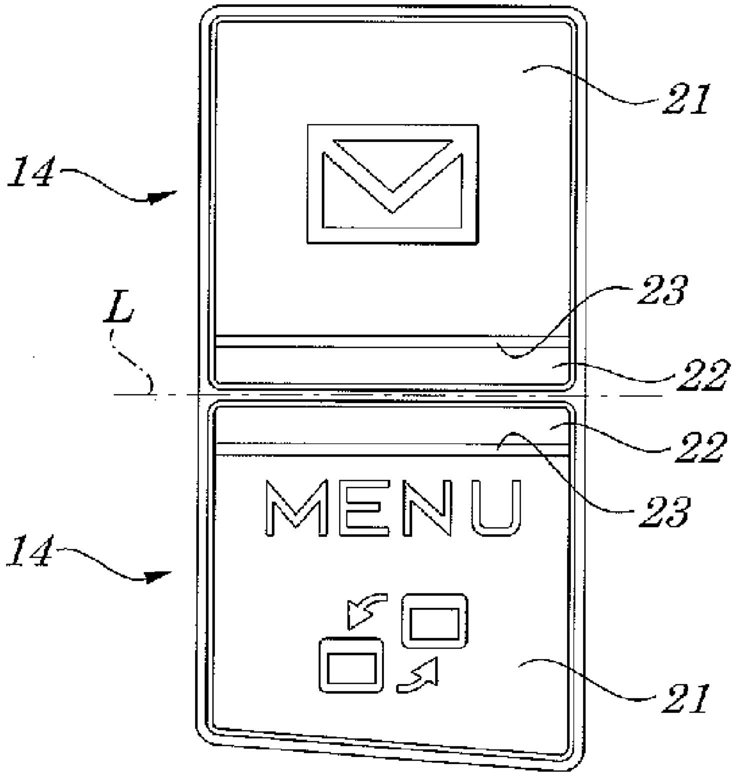
FIGS. 2A and 2B are diagrams showing a configuration of an operation key of the mobile phone.
Figure 2B:
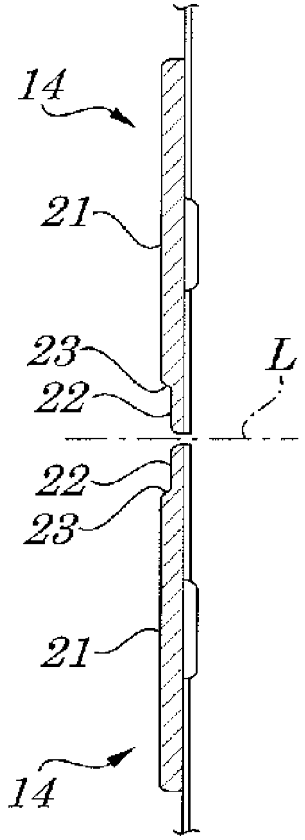
Figure 3A:
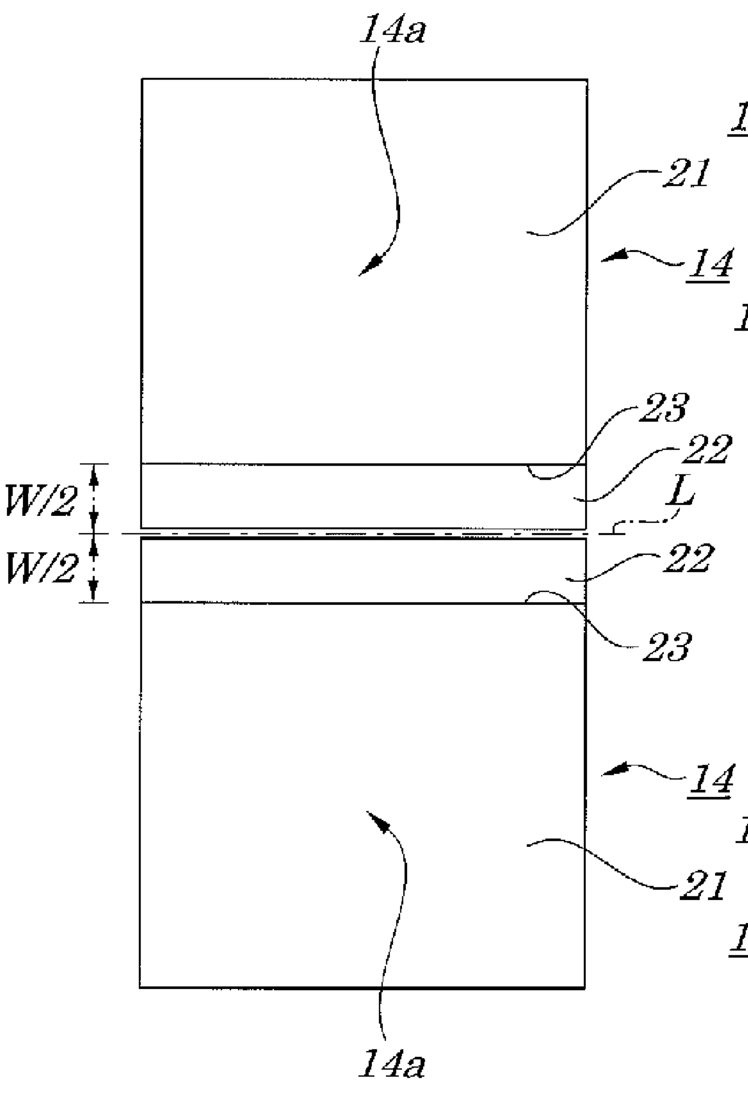
FIGS. 3A and 3B are schematic views showing the configuration of the operation key.
Figure 3B:
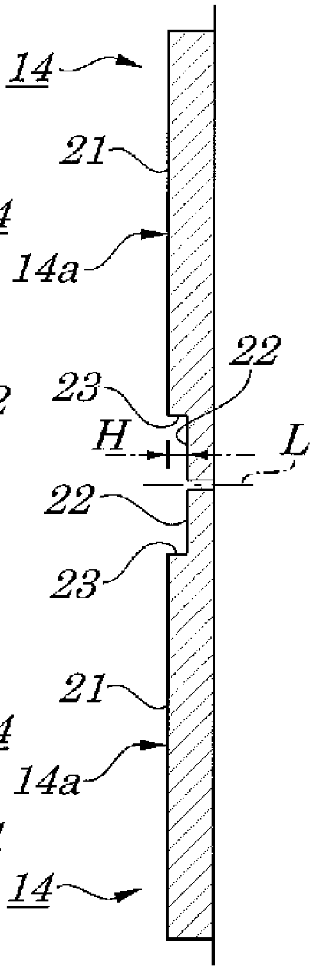
Figure 4:
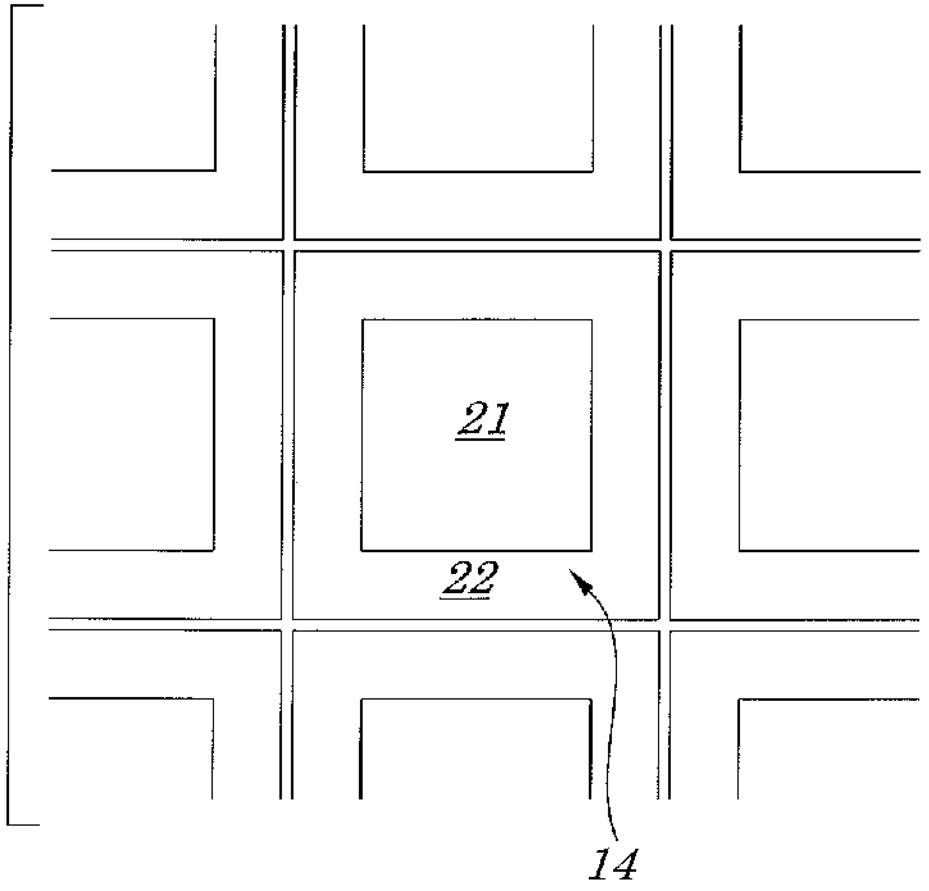
FIG. 4 is a schematic plan view of the operation key different from that shown in FIGS. 3A and 3B.
Figure 5A:
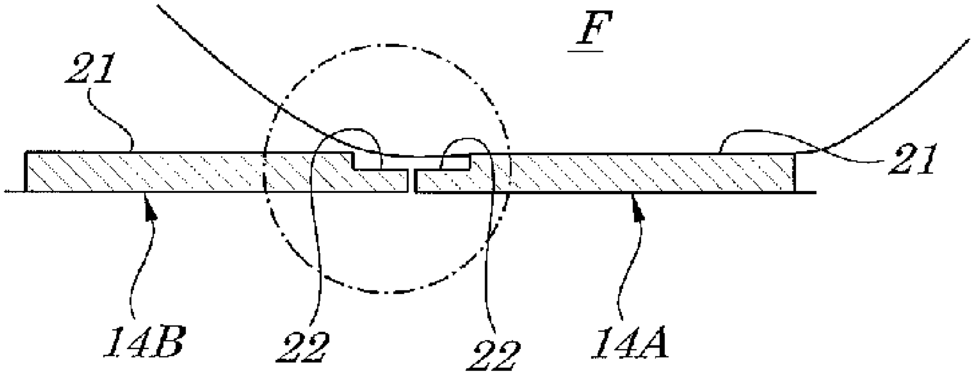
FIGS. 5A, 5B and 5C are diagrams explaining an effect of the operation key.
Figure 5B:
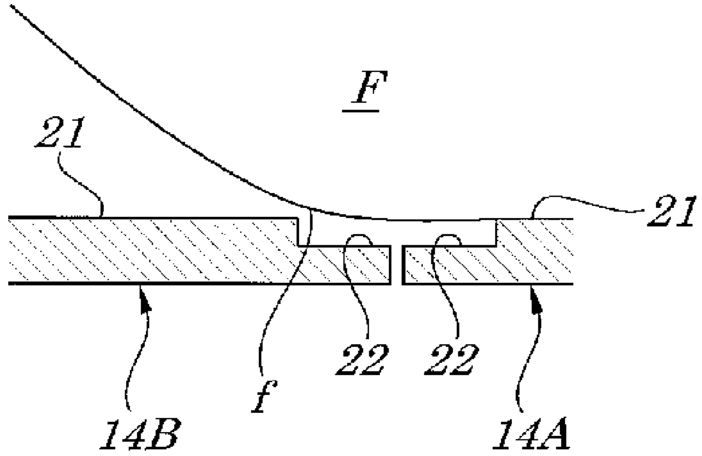
Figure 5C:
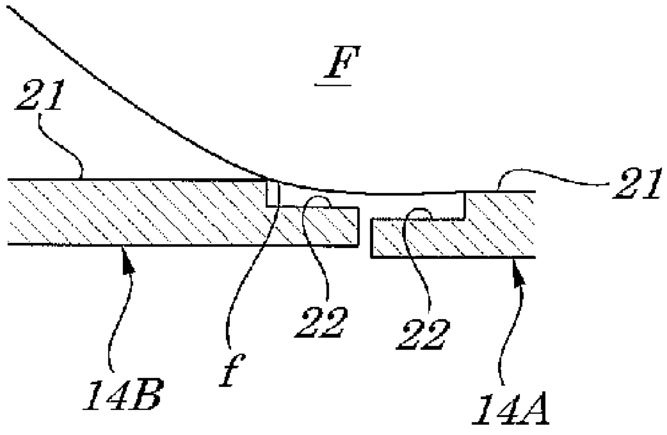
Figure 6A:
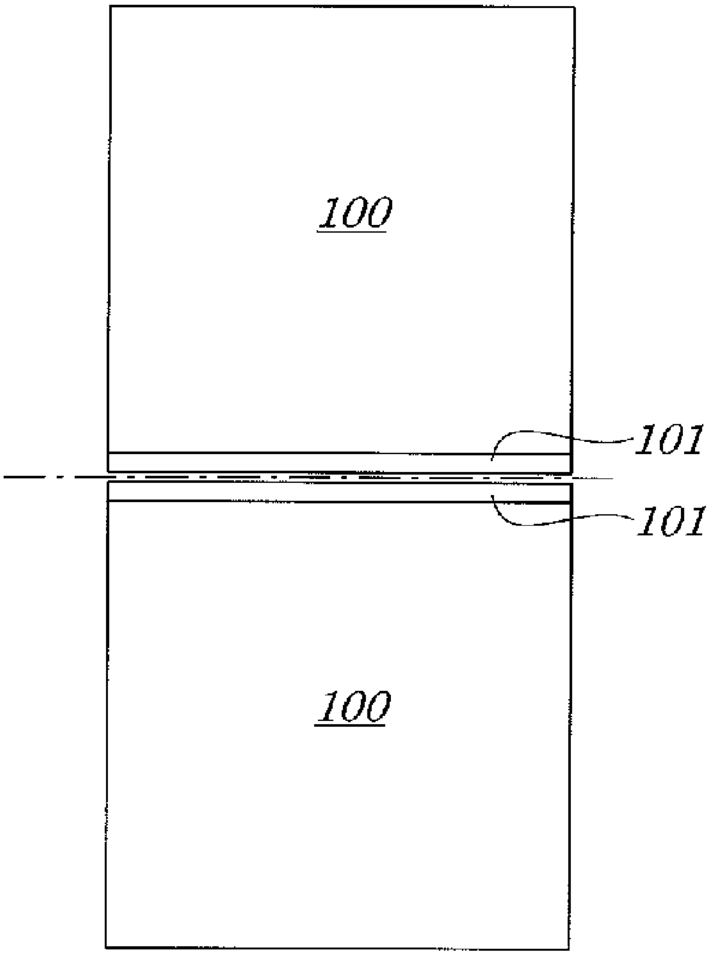
FIG.6A (RELATED ART)
FIGS. 6A and 6B are diagrams showing a configuration of an operation key of a mobile phone provided as a first related art.
Figure 6B:
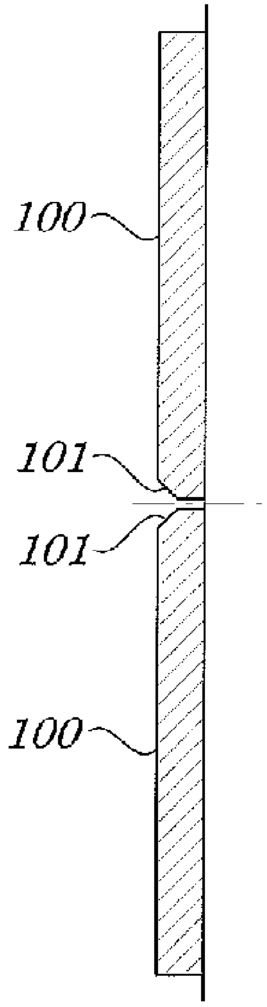
FIG.6B (RELATED ART)
Figure 7A:
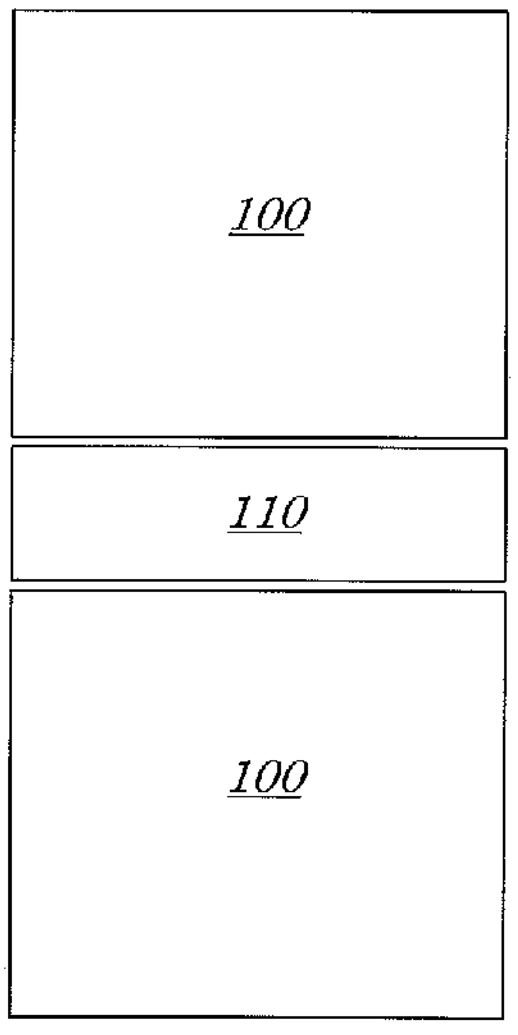
FIG. 7A (RELATED ART)
FIGS. 7A and 7B are diagrams showing a configuration of an operation key of a mobile phone different from that shown in FIGS. 6A and 6B provided as a second related art.
Figure 7B:
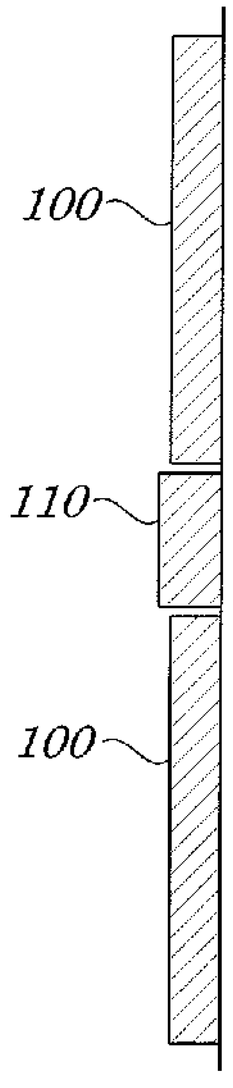
FIG. 7B (RELATED ART)

FIG. 1 is a perspective drawing showing an external view of a mobile phone according to an exemplary embodiment of the present invention. FIGS. 2A and 2B are diagrams showing a configuration of an operation key of the mobile phone, FIG. 2A is a plan view of the operation key and FIG. 2B is a vertical cross-sectional view of the operation key. FIGS. 3A and 3B are schematic views showing the configuration of the operation key, FIG. 3A is a schematic plan view of the operation key and FIG. 3B is a schematic vertical cross-sectional view of the operation key. FIG. 4 is a schematic plan view of the operation key different from that shown in FIGS. 3A and 3B. FIGS. 5A, 5B and 5C are diagrams showing the effect of the operation key, FIG. 5A is a vertical cross-sectional view of the operation key, FIG. 5B is an expanded vertical cross-sectional view of the operation key in the circled area shown in FIG. 5A, and FIG. 5C is an expanded vertical cross-sectional view of the operation key in the circled area shown in FIG. 5B.

As shown in FIG. 1, the mobile phone (small-sized electronic device) of the exemplary embodiment is so configured that an operation housing case 11 and a display housing case 12 are connected to each other through a hinge portion 13 in a manner to be freely opened and closed and to be of a folding type. The operation housing case 11 has an operation portion 15 on which various operation keys 14 are arranged and the display housing case 12 has a display screen 16.

As shown in FIGS. 2A and 2B, the operation portion 15 is divided, in a portion where a plurality of the operation keys 14, 14, . . . is arranged in parallel in a manner to be adjacent to one another, into one having a higher step surface 21 and the other having a lower step surface 22, both being parallel to a planar direction, by a step height formed on an operation surface on an upper side of each of the operation keys 14 to be used for input operation by pressing down the keys 14 with a finger of a user (operator) of the mobile phone. The lower step surfaces 22 of the operation keys 14 are formed to be approximately symmetrical with respect to a boundary line L. The higher and lower step surfaces 21 and 22 are integrally coupled to each other through a wall surface 23 formed in a manner to be approximately perpendicular to the planar direction. The higher step surface 21, the lower step surface 22, and the wall surface 23 of the operation key 14 is schematically shown in FIGS. 3A and 3B and, when other operation keys 14 are arranged in a portion surrounding the operation key 14, these surfaces 21, 22, and 23 are also schematically shown in FIG. 4.

The higher step surface 21 of each of the operation keys 14 occupies an operation region containing a central portion 14*a* to be used at a time of input operation through the operation key 14 to be first touched by a finger at the input operation time and is therefore located in the highest level portion in the pressed-down direction. Moreover, the lower step surface 22 of the operation key 14 is formed on the side where the operation keys 14 are adjacent to one another and is located in the lower level portion in the pressed-down direction.

The lower step surface 22 of the operation key 14 is formed, in a direction adjacent to another operation key 14, so as to have a width being a half of the press-down error width W in which an operator erroneously presses down a key different from one originally targeted by the operator, in other words, a width being a half of a safe operation width W that can ensure the prevention from an operational errors by providing a sufficient interval between end portions of the neighboring operation keys 14. That is, the lower step surfaces 22 of the operation keys 14 are formed to be approximately symmetrical with respect to the boundary line L, which means that the whole of the lower step surface 22 of the operation key 14 makes the end portions of the higher step surface 21 be apart, by the press-down error width W, from each other. Thus, as shown in FIGS. 2A and 2B, if the design on the key surface shows indication information inducing the press-down on the center of the higher step surface 21, the width of the lower step surface 22 of one operation key 14 may be set to be not less than a half of the press-down error width W. If the design on the key surface shows indication information inducing the press-down on the center of the whole operation key 14, the width of the lower step surface 22 of one operation key 14 may be set to be the press-down error width W or so. Moreover, the above press-down error width W may be calculated by carrying out a test of the occurrence of operational errors made at time of input operations by a plurality of users to obtain a dimension in which the rate of the occurrence of operational errors becomes a necessary value through statistical procedures or through simple averaging procedures. Since the press-down error width W changes depending on the size of the operation key and, therefore, by using the area ratio as a reference, for example, the area of the lower step surface 22 for each end portion of the operation key 14 may be set to be not less than one-fifth of the area of the higher step surface 21.

The wall surface 23 is formed so as to have a height H being equivalent to pressed-down amount (pressed-down depth) that can allow inputting of the operation key 14 to be ensured, that is, that can generate an input signal by pressing down a switch corresponding to the operation key 14 and also to provide at least a required level difference in height between the higher step surface 21 and lower step surface 22.

By configuring as above, in the operation keys 14 arranged adjacent to one another, a user can easily identify the position of the higher step surface 21 not only by recognizing the design of key information to be indicated on the higher step surface 21 as shown in FIGS. 2A and 2B but also by touching the lower step surface 22 having a press-down error width W located in a portion of a border position among the operation keys 14 adjacent to one another, with a finger tip F, as shown in FIG. 5A, to press down the higher step surface 21 with a large area for letting the operation key 14A sink down to perform input operations. At this point of time, even if the finger tip F of a user lies off the higher step surface 21 of the operation key 14A, the finger tip F is not caught on the higher step surface 21 of an operation key 14B adjacent to the operation key 14A, located in space above the lower step surface 22. Moreover, by configuring as above, as shown in FIGS. 5A, 5B and 5C, before the finger tip F to press down the higher step surface 21 of the operation key 14A comes into contact with the lower step surface 22 of the operation key 14B adjacent to the operation key A, a correct input signal has been already generated to terminate the press-down input operation. Therefore, by letting larger lower step surfaces 22 be formed in a manner to be adjacent to one another, it is made possible to secure the higher step surface 21 to be pressed down as a surface being as large as possible, which enables the avoidance of the occurrence of operational errors of erroneously pressing down an operation key 14.

Thus, since the operation keys 14 are arranged in the operation portion 15 of a mobile phone and the pressed-down amount required for the occurrence of an input signal is very small, the height H of the wall surface 23 is almost not necessary and the wall surface formed by considering design only is sufficient.

Even if the height H of the wall surface 23 is set, before the occurrence of the input signal, to a degree to which the finger tip F to press down the higher step surface 21 of the operation key 14A comes into contact with the lower step surface 22 of the operation key 14B adjacent to the operation key 14A, a further press-down step is necessary such that an input signal is generated by pressing down the operation key 14B adjacent to the operation key 14A. Moreover, since the place where the operation key 14B is pressed down is not the central portion 14*a* of the higher step surface 21 but the lower step surface 22 adjacent thereto, a smooth press-down step is impossible and the press-down force being larger than originally required for pressing down the operation key 14A is necessary. In addition, it is an edge portion f surrounding the finger tip F that presses down the lower step surface 22 of the operation key 14B and, therefore, the edge portion f tends to be bent and warped and, in order to generate the press-down force to perform the input operation of the operation key 14B while the edge portion f of the finger tip F is being deformed, the force strongly to push the operation key 14B in the pressed-down direction is required. Therefore, it is not necessary that the height H of the wall surface 23 of the operation key 14 is secured to the extent of the amount of the press-down (press-down depth) by which the inputting of the operation key 14 is judged to have been performed and, even if the difference in height (height H of the wall surface 23) between the higher step surface 21 and lower step surface 22 is made smaller, the occurrence of the operational errors in pressing down the operation key 14 for inputting can be avoided.

Moreover, in the operation keys 14, the higher step surface 21 and the lower step surface 22 are contiguous to each another along a planar direction through the wall surface 23 and, further, the area of each of the lower step surface 22 is set to be one-fifth of the area of the higher step surface 21. Further, even when other operation keys 14C are arranged in the portion surrounding the operation key 14, for example, as shown in FIG. 4, the area of the lower step surface 22 is set to be not more than the area of the higher step surface 21.

By configuring as above, in the operation key 14, various required and sufficient information can be indicated on its higher step surface 21 having a large area and also various key information can be indicated on the lower step surface 22 having a sufficient area, being parallel to its higher step surface 21 in the planar direction. Therefore, in the operation key 14, as the surface on which various information is indicated, the area of its higher step surface 21 can be made larger and necessary information can be indicated on its lower step surface 22.

Thus, according to the exemplary embodiment, the lower step surface 22 having the press-down error width W with the boundary line L as its central line can be located on a boundary side among the operation keys 14 adjacent to one another which enables the reliable avoidance of the erroneous inputting by pressing down the higher step surface 21 of another adjacent operation key 14B at the time of pressing down the higher step surface 21 of the targeted operation key 14A. As a result, erroneous inputting can be prevented without the need for forming a useless region in a portion where the operation keys are arranged in the operation portion 15 and an area of the operation key 14 occupied in the operation key can be made small by constructing the compact operation key 14 using only the higher step surface 21 and lower step surface 22. Moreover, it is made possible not only to indicate sufficient information on the higher step surface 21 having a large area but also to indicate necessary information enabling easy identification of the inputting key on each of the lower step surfaces 22 formed parallel to one another in a planar direction. Therefore, the entire operation portion 15 can be small-sized by constructing the operation key 14 so as to be miniaturized and also by securing areas required for inputting operation and indication of key information.

Although not shown in drawings, in another possible exemplary embodiment of present invention, it is not necessary that the operation portion arranged with operation keys is integrally formed with the main body of an electronic device. For example, the present invention can be applied to operation keys mounted in a keyboard, ten key, or the like connected individually to a personal computer.

Thus, the exemplary embodiments of the present invention are described by referring to the drawings. However, it is apparent that the present invention is not limited to the above exemplary embodiment but may be changed and modified without departing from the scope and spirit of the invention. For example, the present invention may be applied not only to an operation key arranged in an operation portion having a large area but also to several operation keys arranged on an operation portion having a small area and, in addition, to operation keys arranged in parallel in side portions of a housing of a mobile phone.

The present invention claims priority based on Japanese Patent Application Laid-open No. 2009-016040 filed Jan. 17, 2009, the entire contents of which are incorporated herein by reference in its entirety.

INDUSTRIAL APPLICABILITY

The present invention can be widely and suitably applied not only to a mobile phone, key board, or the like but also to a small-sized mobile electronic terminal having an operation portion such as a PDA (Personal Digital Assistant) and to an operation panel having arranged operation keys such as various control devices.

EXPLANATION OF LETTERS AND NUMERALS

14, 14A, 14B, and 14C: Operation key
14*a*: Central portion
15: Operation portion
21: Higher step surface
22: Lower step surface
23: Wall surface
F: Finger tip (finger)
H: Height (pressed-down height)
L: Boundary, W: Press-down error width

What is claimed is:

1. A key structure of an operation section of an electronic device having a plurality of operation keys arranged in parallel in a manner to be adjacent to one another comprising:

an operation portion having a step height formed in the operation key that performs input operations by being pressed down with a finger of an operator, wherein said operation portion of said operation key comprises a higher step surface located in a higher level portion in a pressed-down direction and a lower step surface formed at least on an adjacent side where said operation keys are adjacent to one another in a level portion lower than said higher step surface in said pressed-down direction, wherein said higher step surface and said lower step surface are formed so as to be approximately planar surfaces being parallel to each other and a width of said lower step surface is set to be not less than a half of an error width of said press-down operation as a width in an adjacent direction with respect to said higher step surface; and wherein the step height between said higher step surface and said lower step surface is set to be not less than a press-down height required for said input operations.

2. The key structure of an operation section of an electronic device according to claim 1, wherein an area of said lower step surface on one terminal side of said higher step surface is set to be not less than one-fifth of the area of said higher step surface.

3. The key structure of an operation section of an electronic device according to claim 2, wherein a total area of said lower step surface surrounding said higher step surface is set to be not more than the area of said higher step surface.

4. The key structure of an operation section of an electronic device according to claim 1, wherein said higher step surface and said lower step surface are contiguous to each another along a planar direction at a step height portion being approximately perpendicular to said higher step surface and said lower step surface.

5. An input device having a plurality of operation keys arranged in parallel in a manner to be adjacent to one another comprising:

an operation portion having a step height formed in the operation key that performs input operations by being pressed down with a finger of an operator, wherein said operation portion of said operation key comprises a higher step surface located in a higher level portion in a pressed-down direction and a lower step surface formed at least on an adjacent side where said operation keys are adjacent to one another in a level portion lower than said higher step surface in said pressed-down direction, wherein said higher step surface and said lower step surface are formed so as to be approximately planar surfaces being parallel to each other and a width of said lower step surface is set to be not less than a half of an error width of said press-down operation as a width in an adjacent direction with respect to said higher step surface; and wherein the step height between said higher step surface and said lower step surface is set to be not less than a press-down height required for said input operations.

6. The input device according to claim 5, wherein the lower step surfaces of each of said operation keys are formed to be approximately symmetrical with respect to a boundary line.

* * * * *